United States Patent
Song

(10) Patent No.: US 11,395,120 B2
(45) Date of Patent: Jul. 19, 2022

(54) METHOD AND APPARATUS FOR IDENTIFYING SERVICE ENTITY IN MACHINE TO MACHINE SYSTEM

(71) Applicants: Hyundai Motor Company, Seoul (KR); Kia Motors Corporation, Seoul (KR)

(72) Inventor: Jae Seung Song, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/869,697

(22) Filed: May 8, 2020

(65) Prior Publication Data

US 2020/0359185 A1 Nov. 12, 2020

Related U.S. Application Data

(60) Provisional application No. 62/846,020, filed on May 10, 2019.

(51) Int. Cl.

| H04W 4/00 | (2018.01) |
| G06F 3/12 | (2006.01) |
| H04W 4/70 | (2018.01) |
| H04W 4/50 | (2018.01) |
| H04W 60/00 | (2009.01) |
| H04W 48/14 | (2009.01) |
| H04W 8/12 | (2009.01) |

(52) U.S. Cl.
CPC ............. *H04W 4/70* (2018.02); *H04W 4/50* (2018.02); *H04W 8/12* (2013.01); *H04W 48/14* (2013.01); *H04W 60/00* (2013.01)

(58) Field of Classification Search
CPC ......... H04W 4/70; H04W 4/50; H04W 60/00; H04W 48/14; H04W 8/12
USPC .......................................................... 370/329
See application file for complete search history.

(56) References Cited

U.S. PATENT DOCUMENTS

| 6,032,202 | A  * | 2/2000 | Lea ....................... G06F 9/4411 710/3 |
| 6,604,140 | B1 * | 8/2003 | Beck ..................... G06F 9/5055 709/201 |
| 6,708,171 | B1 * | 3/2004 | Waldo ..................... G06F 9/548 |
| 2002/0147611 | A1 * | 10/2002 | Greene .......... G06Q 10/063112 705/1.1 |
| 2004/0024912 | A1 * | 2/2004 | Fukao ................... H04L 69/329 709/249 |
| 2004/0059688 | A1 * | 3/2004 | Dominguez ....... G06Q 20/4014 705/75 |
| 2004/0128344 | A1 * | 7/2004 | Trossen ................ H04L 69/329 709/203 |
| 2004/0139194 | A1 * | 7/2004 | Naganathan ........ H04L 43/0817 709/224 |
| 2004/0230636 | A1 * | 11/2004 | Masuoka ................ G06F 9/451 708/800 |

(Continued)

*Primary Examiner* — Mark G. Pannell
(74) *Attorney, Agent, or Firm* — Fox Rothschild LLP

(57) ABSTRACT

Disclosed herein is a method and device for identifying a service entity in an Machine-to-Machine (M2M) system. The method for an M2M device for requesting a service includes transmitting a message requesting information on a service entity to a registry, obtaining the information on the service entity and using the service through the service entity.

6 Claims, 10 Drawing Sheets

(56) References Cited

U.S. PATENT DOCUMENTS

| | | | |
|---|---|---|---|
| 2009/0217348 A1* | 8/2009 | Salmela | H04W 12/06 726/2 |
| 2010/0094925 A1* | 4/2010 | St Jacques, Jr. | H04N 21/4788 709/202 |
| 2017/0269885 A1* | 9/2017 | Omori | G06F 3/1288 |
| 2019/0007513 A1* | 1/2019 | Flynn, IV | H04L 67/2823 |

* cited by examiner

METHOD AND APPARATUS FOR IDENTIFYING SERVICE ENTITY IN MACHINE TO MACHINE SYSTEM

CROSS REFERENCE TO RELATED APPLICATION

The present application claims priority to a U.S. provisional application 62/846,020, filed May 10, 2019, the entire contents of which are incorporated herein for all purposes by this reference.

BACKGROUND OF THE INVENTION

Field of the Invention

The present invention relates to a method and apparatus for identifying a service entity in an Machine-to-Machine (M2M) system. More particularly, the present invention relates to a method and apparatus for identifying a service entity that provides a suitable service for an application in an M2M system.

Description of the Related Art

Recently, introduction of Machine-to-Machine (M2M) system has become active. An M2M communication may refer to a communication carried out between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY OF THE INVENTION

The present invention aims to provide a method and device for identifying a service entity rendering a suitable service in an Machine-to-Machine (M2M) system.

DETAILED DESCRIPTION OF THE INVENTION

Figure 1:
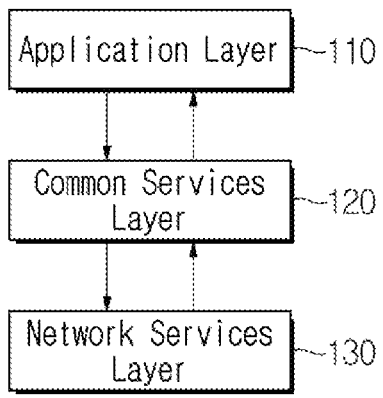
FIG. 1 is a view illustrating a layered structure of an Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In addition, the present specification describes a network based on Machine-to-Machine (M2M) communication, and a work in M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station.

In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present invention mainly describes an M2M system but is not solely applied thereto.

In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of an Machine-to-Machine (M2M) system according to the present disclosure.

Referring to FIG. 1, a layered structure of an M2M system may consist of an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M).

The network services layer 130 may provide the common services layer 120 with services such as device management, location service and device triggering. Herein, an entity operating based on the network layer 120 may be a network service entity (NSE).

Figure 2:
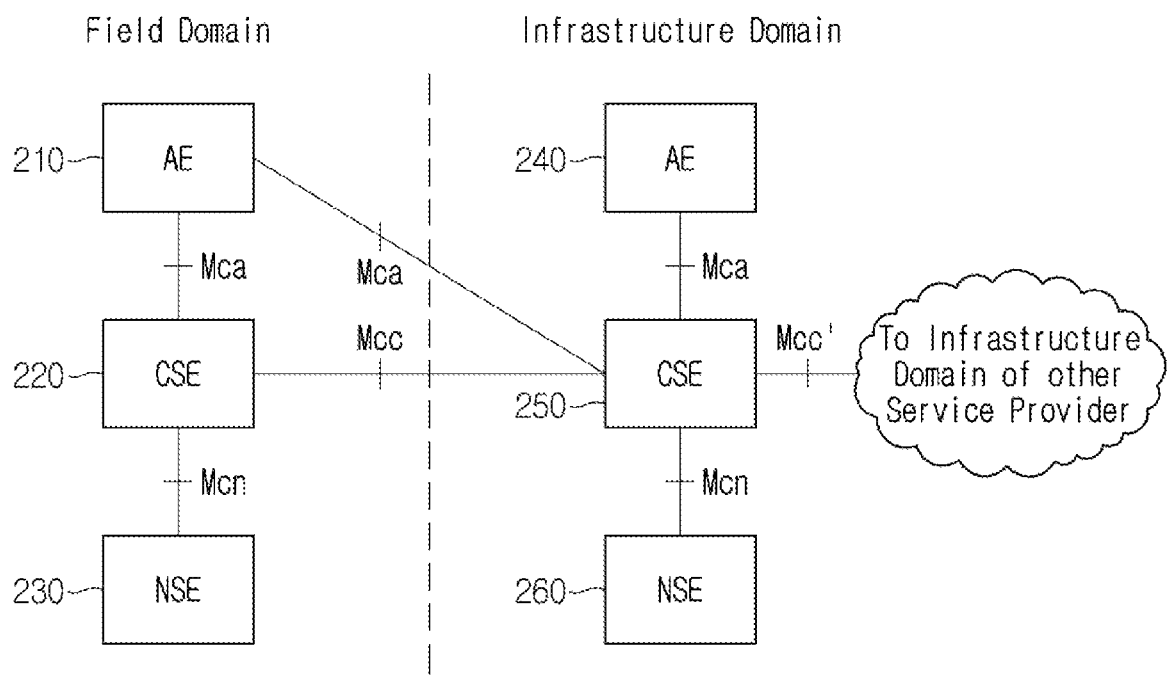
FIG. 2 is a view illustrating reference points in an M2M system according to the present disclosure.

FIG. 2 is a view illustrating reference points in an M2M system according to the present disclosure.

Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. Here, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
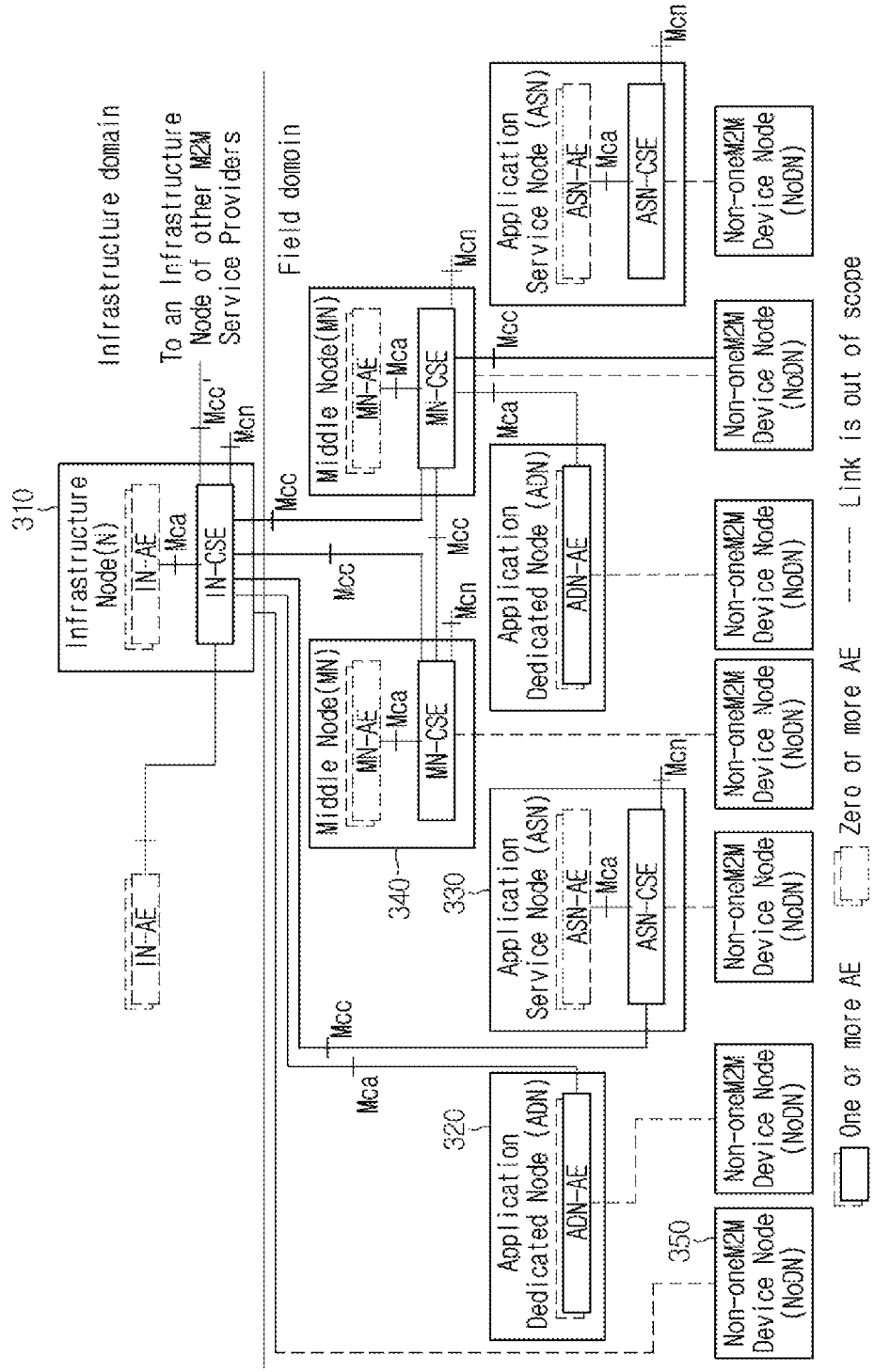
FIG. 3 is a view illustrating each node in an M2M system according to the present disclosure.

FIG. 3 is a view illustrating each node in an M2M system according to the present disclosure.

Referring to FIG. 3, an infrastructure domain of a specific M2M service provider may provide a specific infrastructure node (IN) 310. Herein, the CSE of the IN may perform communication based on the AE and the reference point Mca of another infrastructure node. In this case, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. Here, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In this case, an ASN may be a node connected to an IN. For example, an ASN may be a node that is set in an M2M terminal in hardware.

In addition, a middle node (MN) 340 may be a node including a CSE and including zero or more AEs. Here, the MN may be set in the field domain. An MN may be connected to another MN or IN based on a reference point. In addition, for example, an MN may be set in an M2M gateway in hardware.

In addition, as an example, a non-M2M terminal node 350 (Non-M2M device node, NoDN) is a node that does not include M2M entities. It may be a node that performs management or collaboration together with an M2M system.

Figure 4:
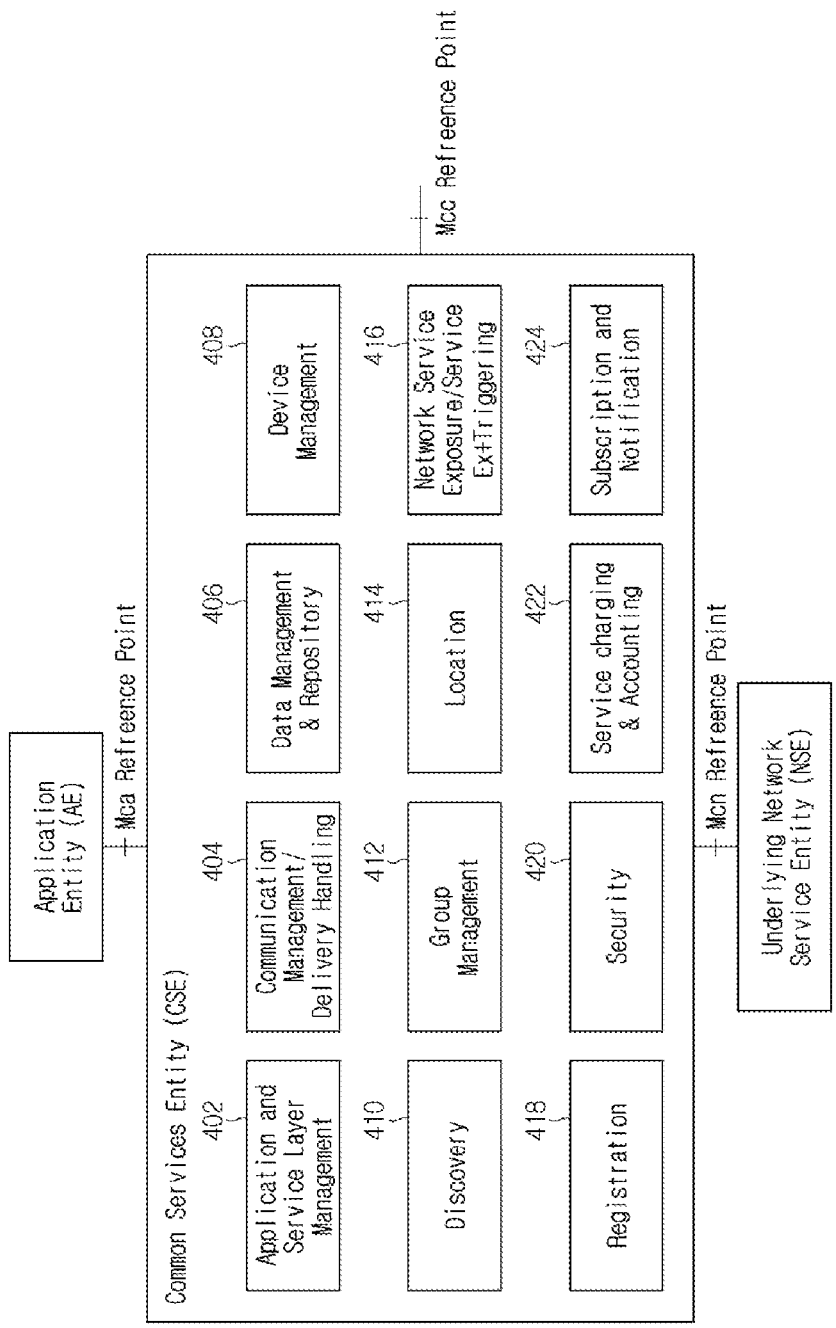
FIG. 4 is a view illustrating a common service function in an M2M system according to the present disclosure.

FIG. 4 is a view illustrating a common service function in an M2M system according to the present disclosure.

Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described embodiment.

The application and service layer management 402 CSF provides management of AEs and CSEs. The application and service layer management 402 CSF includes not only the configuring, problem solving and upgrading of CSE functions but also the capability of upgrading AEs.

The communication management and delivery handling 404 CSF provides communications with other CSEs, AEs and NSEs. The communication management and delivery handling 404 CSF determines at what time and through what connection communications are to be delivered, and also determines to buffer communication requests so that the communications can be delivered later, if necessary and permitted.

The data management and repository 406 CSF provides data storage and transmission functions (for example, data collection for aggregation, data reformatting, and data storage for analysis and sematic processing).

The device management 408 CSF provides the management of device capabilities in M2M gateways and M2M devices.

The discovery 410 CSF provides an information retrieval function for applications and services on the basis of filter criteria.

The group management 412 CSF provides processing of group-related requests. The group management 412 CSF enables an M2M system to support bulk operations for many devices and applications.

The location 414 CSF provides a function of enabling AEs to obtain geographical location information.

The network service exposure/service execution and triggering 416 CSF manages communications with base networks for access to network service functions.

The registration 418 CSF provides a function of registering AEs (or other remote CSEs) to a CSE. The registration 418 CSF allows AEs (or remote CSE) to use services of CSE.

The security 420 CSF provides a service layer with security functions like access control including identification, authentication and permission.

The service charging and accounting 422 CSF provides charging functions for a service layer.

The subscription/notification 424 CSF provides a function of allowing subscription to an event and notifying the occurrence of the event.

Figure 5:
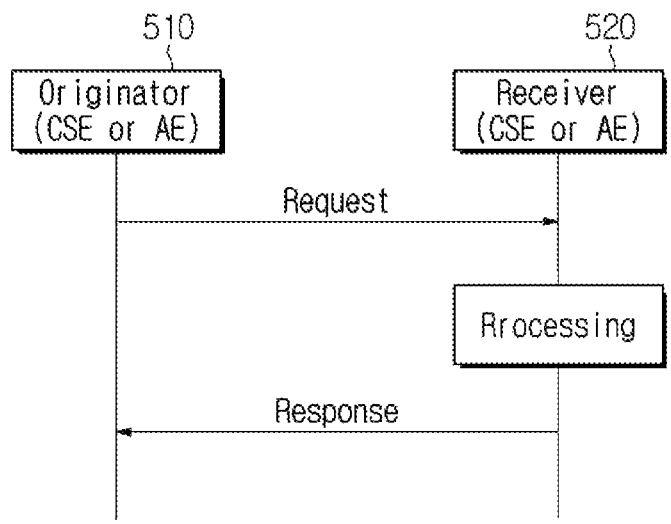
FIG. 5 is a view illustrating that an originator and a receiver exchange a message in an M2M system according to the present disclosure.

FIG. 5 is a view illustrating that an originator and a receiver exchange a message in an M2M system according to the present disclosure.

Referring to FIG. 5, the originator 501 may transmit a request message to the receiver 520. Here, the originator 510 and the receiver 520 may be the above-described M2M terminals. However, the originator 510 and the receiver 520 are not limited to M2M terminals but may be other terminals. They are not limited to the above-described embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Herein, for example, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. Here, a transmission terminal-related parameter may be a parameter for the originator 510. In addition, a receiving terminal-related parameter may be a parameter for the receiver 520. In addition, an identification parameter may be a parameter required for identification of each other.

In addition, an operation parameter may be a parameter for distinguishing operations. For example, an operation parameter may be set to any one among Create, Retrieve, Update, Delete and Notify. In other words, the parameter may aim to distinguish operations.

Here, when receiving a request message from the originator 510, the receiver 520 may process the message. For example, the receiver 520 may perform an operation included in a request message. For the operation, the receiver 520 may determine whether or not a parameter is valid and authorized. Here, if a parameter is valid and authorized, the receiver 520 may check whether or not there is a requested resource and may perform processing accordingly.

For example, in case an event occurs, the originator 510 may transmit a request message including a parameter for notification to the receiver 520. The receiver 520 may check a parameter for a notification included in a request message and may perform an operation accordingly. The receiver 520 may transmit a response message to the originator 510.

A message exchange process using a request message and a response message, as illustrated in FIG. 5, may be performed between AE and CSE on the basis of the reference point Mca or between CSEs on the basis of the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred TABLE 1-continued Response message parameter/success or not To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multiplicity | Description |
|---|---|---|
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator=Sam". "creator=Sam*". "creator=*Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. |

TABLE 2-continued

| Condition tag | Multiplicity | Description |
|---|---|---|
| | | Matching Conditions |
| | | In the case of semantic resource discovery targeting a specific resource, if the semantic description contained in the <semanticDescriptor> of a child resource matches the semanticFliter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . ./tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |

TABLE 4-continued

| Request message parameter |
|---|
| Result Content - the expected components of the result |
| Event Category - indicates how and when the system should deliver the message |
| Delivery Aggregation - aggregation of requests to the same target CSE is to be used |
| Group Request Identifier - identifier added to the group request that is to be fanned out to each member of the group |
| Group Request Target Members-indicates subset of members of a group |
| Filter Criteria - conditions for filtered retrieve operation |
| Desired Identifier Result Type - format of resource identifiers returned |
| Token Request Indicator - indicating that the Originator may attempt Token Request procedure (for Dynamic Authorization) if initiated by the Receiver |
| Tokens - for use in dynamic authorization |
| Token IDs - for use in dynamic authorization |
| Role IDs - for use in role based access control |
| Local Token IDs - for use in dynamic authorization |
| Authorization Signature Indicator - for use in Authorization Relationship Mapping |
| Authorization Signature - for use in Authorization Relationship Mapping |
| Authorization Relationship Indicator - for use in Authorization Relationship Mapping |
| Semantic Query Indicator - for use in semantic queries |
| Release Version Indicator - the oneM2M release version that this request message conforms to. |
| Vendor Information |

A normal resource includes a complete set of representations of data constituting the base of information to be managed. Unless qualified as either "virtual" or "announced", the resource types in the present document are normal resources.

A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource.

Resource announcement enables resource discovery. An announced resource at a remote CSE may be used to create a child resource at a remote CSE, which is not present as a child of an original resource or is not an announced child thereof.

In order to support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

There may be many Infrastructure node (IN)-CSEs in a particular region (for example, a city, a smart city, etc.). There may be an environment where IN-CSEs provide various IoT services through various IoT service providers. In this case, from the perspective of an IoT device visiting such a region, many problematic situations may occur. For example, such problematic situations may include the following problems. How to find IN-CSEs demanded by an IoT application operating in an IoT device among a large amount of IoT service platforms? Whether or not the IoT application needs to know which provider provides the service? Whether or not the user of the IoT device can discover an available IN-CSE for a desired service (for example, smart parking)? Whether or not the IoT application can know an IN-CSE providing a particular service? Do we know how many oneM2M IoT service platforms are running over the world?

Figure 6:
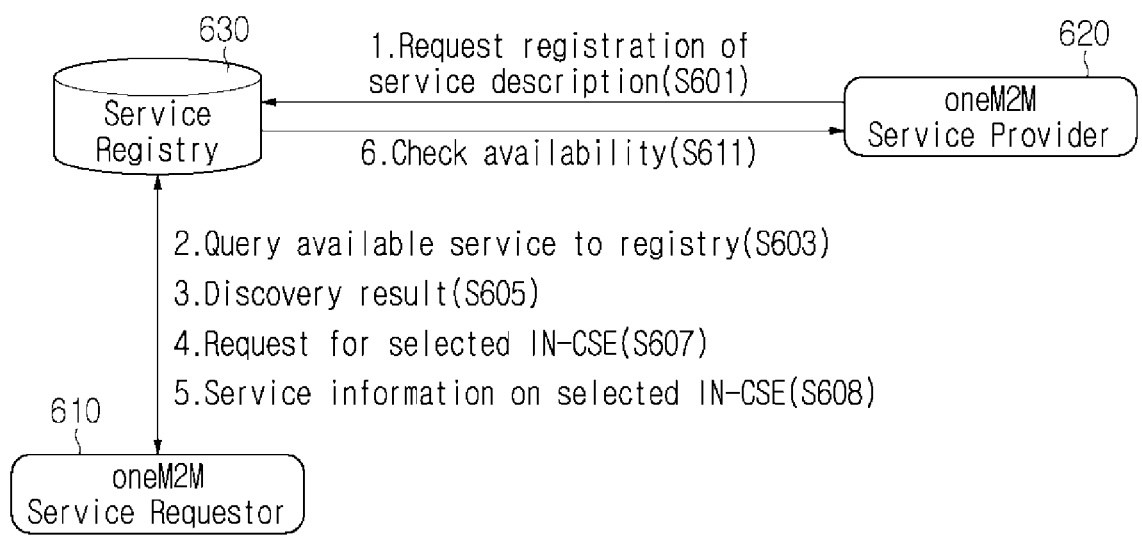
FIG. 6 is a view illustrating an example of interaction between oneM2M entities in an M2M system according to the present disclosure.

FIG. 6 is a view illustrating an example of interaction between oneM2M entities in an M2M system according to the present disclosure.

Referring to FIG. 6, in the step S601, the oneM2M service provider 620 transmits a registration request for service description to the service registry 630. In the step S603, the oneM2M service requestor 610 transmits a query for available services to the service registry 630. For example, a query may be about IN-CSE. In the step S605, the service registry 630 transmits discovery results to the oneM2M service requestor 610. Here, the discovery results may be provided with status information.

In the step S607, the oneM2M service requestor 610 transmits a request for the selected IN-CSE to the service registry 630. In the step S609, the service registry 630 transmits the service information for the selected IN-CSE to the oneM2M service requestor 610. In the step S611, the service registry 630 performs an availability check for the oneM2M service provider 620.

A process described with reference to FIG. 6 includes the registration, discovery and management of a oneM2M service platform. To discover oneM2M Service Platforms, a service platform registry is needed. This requires describing and registering a oneM2M service layer platform (i.e., IN-CSE). Publication of IN-CSE requires the proper description of a hosting IoT service in terms of business, service, and technical information. Registration deals with the persistent operation of storing IN-CSE descriptions in the IoT service platform registry.

Service platform discovery is a process of locating IoT service providers and retrieving IoT service provider descriptions that have been previously published.

Interrogating services involve querying the service registry for IoT service platforms meeting the needs of a service platform requestor. A query consists of search criteria such as the type of the desired service, preferred prices and a maximum number of returned results. The query is executed for service information published by a service provider. Discovering IoT service platforms is a process depending on the architecture of the service registry. When the discovery process is completed, the IoT application may know the exact location of an IN-CSE via Contact of Address (CoA) and how to interface with it.

In the process of FIG. 6, the availability check is an operation for monitoring the availability of a registered service and may be referred to as a liveness check. A registry may periodically check the liveness of at least one IN-CSE. An IN-CSE may not be available because of various reasons. For example, such reasons may include at least one among maintenance, failure and temporary disorder. An unavailable IN-CSE may not be discovered or discovered with the status of unavailability.

Figure 7:
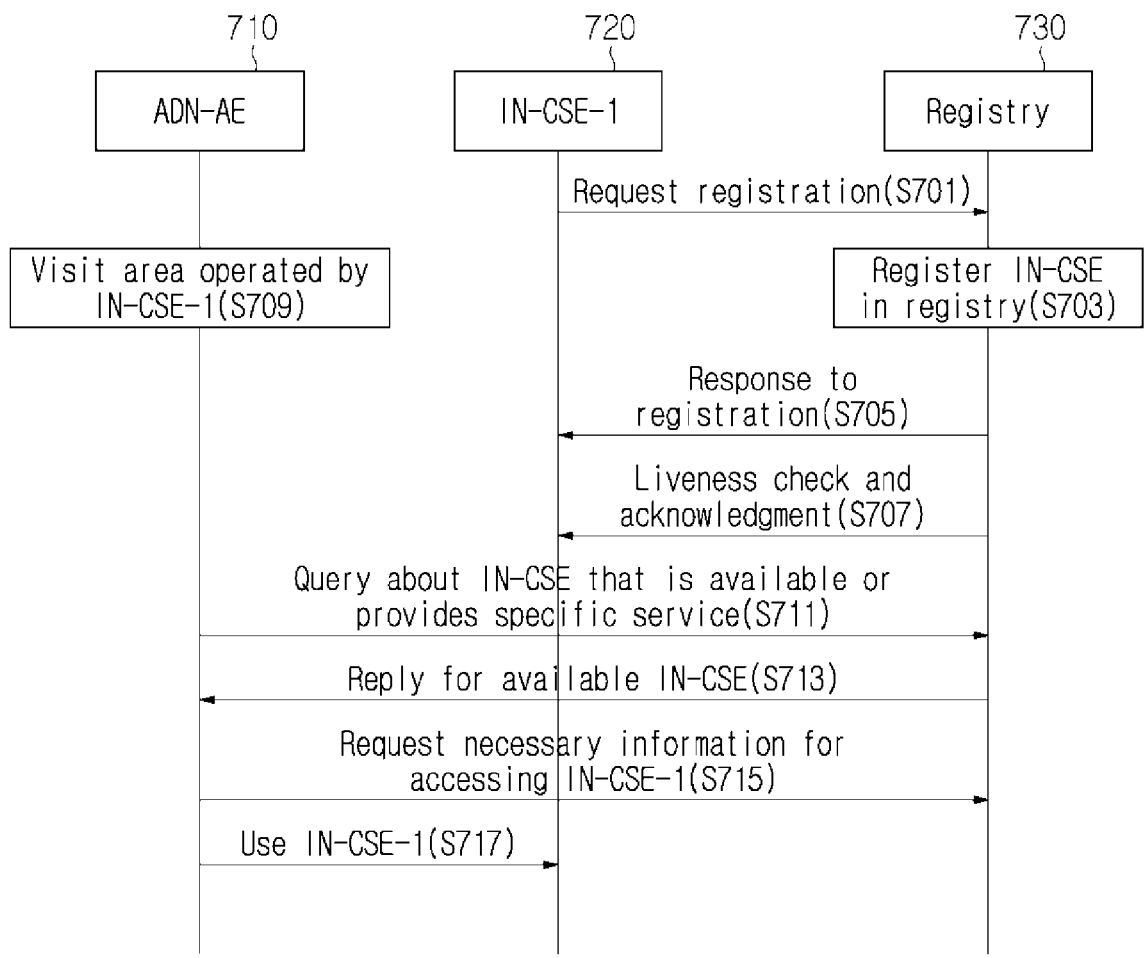
FIG. 7 is a view illustrating an example of process for registering and discovering a CSE in an M2M system according to the present disclosure.

FIG. 7 is a view illustrating an example of process for registering and discovering a CSE in an M2M system according to the present disclosure. FIG. 7 is an example of process where IN-CSE-1 720 existing in a particular region is registered in the registry 730 and ADN-AE 710 visiting the region uses a service given by the IN-CSE-1 720.

Referring to FIG. 7, in the step S701, IN-CSE-1 720 transmits a request for register to the registry 730. In the step S703, the registry 730 registers IN-CSE. In the step S705, the registry 730 transmits a response for the registration to IN-CSE-1 720. In the step S702, the registry 730 and IN-CSE-1 720 perform liveness check and acknowledgment. In other words, the registry 730 transmits a message for liveness check to IN-CSE-1 720, and IN-CSE-1 720 transmits a message for Acknowledgment (ACK) to the registry 730.

In the step S709, ADN-AE 710 visits an area operated by IN-CSE-1 720. In the step S711, ADN-AE 710 transmits a query for available IN-CSEs or specific IN-CSEs providing a specific service to the registry 730. Here, the available IN-CSEs may be at least one available IN-CSE in the visited area. For example, a specific service may be a Vehicle to Everything (V2X) service.

In the step S713, the registry 730 transmits a reply concerning available IN-CSEs to ADN-AE 710. In other words, the registry 730 provides ADN-AE 710 with information on available IN-CSEs (for example, a list, available services, etc.).

In the step S715, ADN-AE 710 transmits a request for information required for accessing IN-CSE-1 720 to the registry 730. In other words, if necessary, ADN-AE 710 requests information required for accessing IN-CSE-1 720 to the registry 730. In the step S717, ADN-AE 710 uses IN-CSE-1 720. In other words, ADN-AE 710 are given the corresponding service by IN-CSE-1 720.

As described with reference to FIG. 7, IN-CSE-1 720 and the registry 730 perform communication for registration, and ADN-AE 710 and the registry 730 perform communication for discovery. Hereinafter, a protocol and requirements used for communication between entities are described in further detail.

IN-CSE and registry may use HTTP protocol to exchange IN-CSE description. IN-CSE description may be stored to an XML-based service document. For example, the IN-CSE description may include at least one among CoA (for example, IP address), a port number, the name of IN-CSE, a status, the profile of IN-CSE, the type of IN-CSE, support public services, maintenance information (for example, maintenance time from 01:00~02:00), access information and credential.

Universal Description, Discovery, and Integration (UDDI) may be used to describe IN-CSE. oneM2M specific XML format may be defined to include IN-CSE information. oneM2M System may enable an M2M application to discover available M2M services and M2M infrastructure nodes via oneM2M registry. oneM2M System may enable an M2M Infrastructure node to notify its availability to oneM2M registry.

As described above, a CSE may register its information to a registry. A CSE to be registered to a registry registers its information to another CSE functioning as a registry. The process begins not by the CSE but by an AE. In other words, an AE transmits a message to a CSE that it should provide its information to another CSE functioning as a registry. When a CSE receives information on another CSE functioning as a registry from an AE, it creates a message by using the information given from the AE and its own information and transmits a message to the target CSE, that is, a registry.

In this regard, according to one embodiment of the present invention, the <platformRegistry> resource may be used. Specifically, a CSE to be registered may request another CSE functioning as a registry to add information to the <platformRegistry> resource, and another CSE functioning as a repository may add the received information to the <platformRegistry> managed by it. The detailed process of using the <platformRegistry> resource is as follows.

Figure 8:
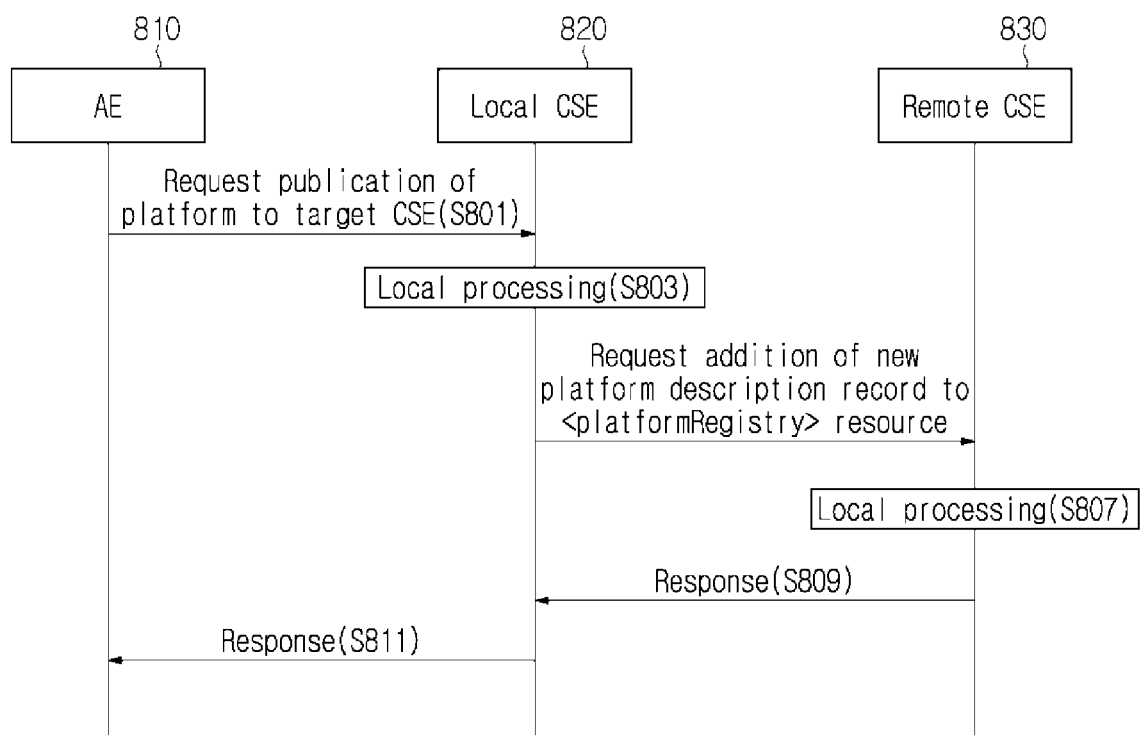
FIG. 8 is a view illustrating an example of process for adding a description for a platform by using <platformRegistry> in an M2M system according to the present disclosure.

FIG. 8 is a view illustrating an example of process for adding a description for a platform by using <platformRegistry> in an M2M system according to the present disclosure.

Referring to FIG. 8, in the step S801, the AE 810 requests the local CSE 820 the publication of platform to a target CSE. In other words, the AE 810 initiates the creation of a platform to a target CSE.

In the step S803, the local CSE 820 performs local processing. Specifically, the local CSE creates a request message to add the information on its platform description to a target CSE. A request message may include at least one among a point of contact, an access token, a supporting service, and a supporting oneM2M feature (for example, an edge, multicast, etc.).

In the step S805, the local CSE 820 requests the remote CSE 830 to add a new platform description record to the <platformRegistry> resource. In other words, the local CSE transmits a request message created in the step S803 to the remote CSE 830 that is a target CSE.

In the step S807, the remote CSE 830 performs local processing. In other words, the remote CSE 830 adds the platform description information of the local CSE 820 to <platformRegistry>. Then, in the step S809, the remote CSE 830 transmits a response to the local CSE 820. In the step S811, the local CSE 820 transmits a response to the AE 810.

Associated reference points for the initiation of adding a record to <platformRegistry> are Mca, Mcc and Mcc'. An initial request may include at least one of the indication of publishing a platform description and the address of a target CSE (for example, the location of CSE hosting <platformRegistry> resource).

In addition, a target CSE may also be the originator of the initiation. In other words, in the process of FIG. 8, the AE 810 and the remote CSE 830 may be the same entity. In addition, in the process of FIG. 8, the local CSE 820 and the remote CSE 830 may be the same entity.

The structure of <platformRegistry> may be as follows. The <platformRegistry> resource is used to store a platform description of various available oneM2M platforms either in a business relationship or publicly open to everyone. The information from the <platformRegistry> is used by applications or CSEs to find out available nearby platforms or platforms providing a specific service.

For example, the <platformRegistry> resource may include attributes presented in Table 5 below.

TABLE 5 addressOfPlatform, 0 . . . 1 (L), address of platform
accessToken, 0 . . . 1 (L), access token to be used to access to the described platform
serviceLabel, 0 . . . 1 (L), available services in the platform
featureLable, 0 . . . 1 (L), supporting features from the platform
Location, 0 . . . 1 (L), location of the platform (this information can be a GPS value or country or city)

According to another embodiment, the <platformRegistry> resource may include the attributes listed in Table 5 and other attributes.

According to one embodiment, the <platformRegistry> resource may be added as a child resource of another resource. For example, the another resource may be <CSEbase> or <remoteCSE>.

Figure 9:
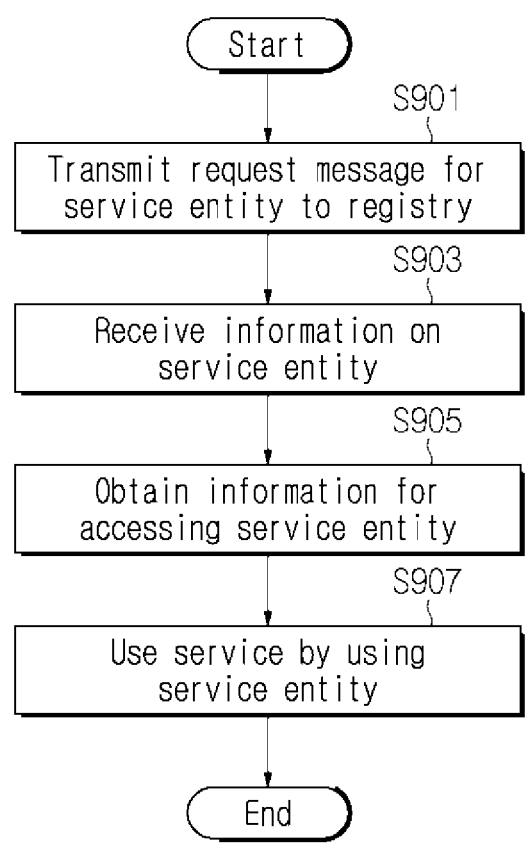
FIG. 9 is a view illustrating an operating method of a device requesting a service in an M2M system according to the present disclosure.

FIG. 9 is a view illustrating an operating method of a device requesting a service in an M2M system according to the present disclosure. The operation subject of FIG. 9 may be an AE of a device requesting a service. Hereinafter, the operation subject in the process of FIG. 9 is referred to as 'device'.

Referring to FIG. 9, in the step S901, a device transmits a query message about a service entity to a registry. A query message may include information on a retrieval criterion for identifying a service entity to be checked in an AE of a device. According to a retrieval criterion, a query message may be understood as a query for a service entity (for example, CSE), a query for a service or a query for an area. For example, a retrieval criterion may be related to at least one among a device, a service, a service entity and a retrieval result. Specifically, a retrieval criterion may be at least one among the location of a device, a specific service, the category of a specific service, all the available services and an available service entity.

In the step S903, the device receives information on a service entity. In other words, a device receives identification information on at least one service entity, which is identified based on a retrieval criterion, as a response to a query message from a registry. Identification information on a service entity may include a list including at least one service entity. Here, at least one service entity included in a list is a service entity registered in a registry. According to one embodiment, the information on the service entity may further include at least one of the information on the status of the at least one service entity and the information on a service that can be provided by the at least one service entity.

In the step S905, the device obtains information for accessing a service entity. For this, according to one embodiment, a device may transmit an additional request message different from a query message to a registry by using identification information on a service entity. In such a case, a request message includes an indicator for at least one service entity, and a device receives information for accessing a service entity corresponding to the indicator as a response to the request message. According to another embodiment, information for access may be included in the information received in the step S903. In this case, a device checks information for accessing the service entity in the received information. For example, information for access may include CoA.

In the step S907, the device uses a service by using a service entity. In other words, a device accesses a service entity on the basis of information obtained in the step S905 and receives a service by exchanging necessary data with the service entity.

As described above with reference to FIG. 9, a device may request information on a service entity (for example, CSE) by transmitting a query message. Here, the query message may be transmitted in response to the satisfaction of a pre-defined condition. For example, the query message may be transmitted as a response to the necessity for changing a device location or a service.

Figure 10:
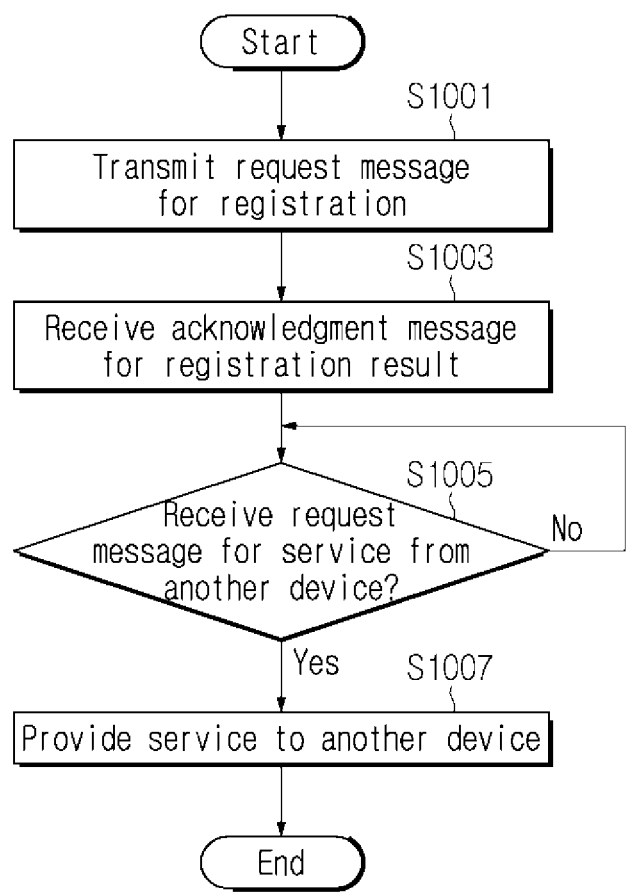
FIG. 10 is a view illustrating an operating method of a device providing a service in an M2M system according to the present disclosure.

FIG. 10 is a view illustrating an operating method of a device providing a service in an M2M system according to the present disclosure. The operation subject of FIG. 10 may be a CSE of a device providing a service. Hereinafter, the operation subject in the process of FIG. 10 is referred to as 'device'.

Referring to FIG. 10, in the step S1001, a device transmits a request message for registration. In other words, a device transmits a request message including description information to a registry in order to register its description information to the registry. Description information includes information on an IoT service that can be provided by a device. According to one embodiment, a request message may further include at least one of the information designating a resource storing description information and the information indicating whether or not the service of a device is available.

In the step S1003, the device receives an acknowledgment message for registration result. The device receives a response that the description information of the device is registered. In other words, an acknowledgment message notifies that the description information of a device is stored in a registry and can be provided at a request of another device.

In the step S1005, the device checks whether or not a request message for a service is received from another device. Here, a request message for a service may occur based on information on the device registered in a registry. When a request message for a service is received, the device provides another device with the service in the step S1007. A device provides a service by allowing the access of another device and exchanging necessary data.

Although not illustrated in FIG. 10, after the device is registered in a registry, the device may further execute an operation of notifying its status to the registry. The operation of notifying a status includes notifying a service-related status of a device in response to a request of a registry. Specifically, when a message for liveness check is received from a registry, a device may transmit a message notifying the current status (for example, whether or not a service can be provided) to the registry as a response.

Although not illustrated in FIG. 10, the device may execute a preliminary operation for obtaining information on a registry. A preliminary operation may be executed between AE and CSE of a device. For example, an AE may request a CSE to register description information in a registry. Here, an AE may provide a CSE with information on a registry (for example, access address). Accordingly, in the above-described step S1001, the CSE may create a request message including description information at a request of AE and transmit the request message to a registry.

Figure 11:
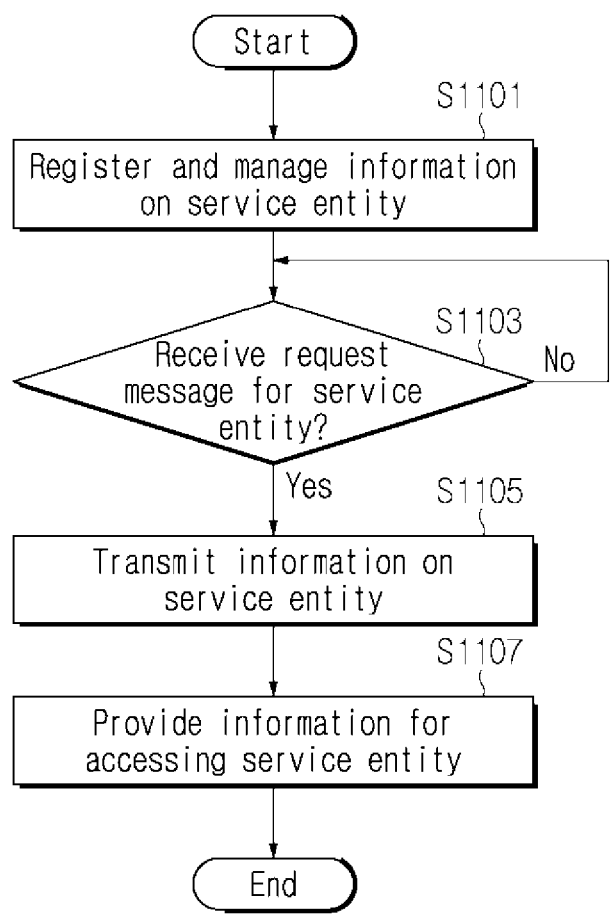
FIG. 11 is a view illustrating an operating method of a device providing information on a device rendering a service in an M2M system according to the present disclosure.

FIG. 11 is a view illustrating an operating method of a device providing information on a device rendering a service in an M2M system according to the present disclosure. The operation subject of FIG. 11 may be the CSE of a device functioning as a registry. Hereinafter, the operation subject in the process of FIG. 11 is referred to as 'device'.

Referring to FIG. 11, in the step S1101, a device registers and manages information on a service entity. At a request of a service entity, a device may register description information on a service provided by a service entity. Then, periodically or aperiodically, a device may check the status of a registered service entity.

In the step S1103, a device checks whether or not a query message for a service entity is received. A device may receive a query message for retrieval of a service entity from another device. A query message may include information on a retrieval criterion. For example, a retrieval criterion may be related to at least one among a device, a service, a service entity and a retrieval result. Specifically, a retrieval criterion may be at least one among the location of a device, a specific service, the category of a specific service, all the available services and an available service entity.

When a query message for a service entity is received, in the step S1105, a device transmits information on the service entity. Specifically, according to a retrieval criterion, a device receiving a query message may identify at least one service entity among registered service entities and transmit a message including information on at least one identified service entity. Information on a service entity may include a list including at least one service entity. Here, at least one service entity included in a list is a service entity registered in a registry.

In the step S1107, a device provides information for accessing a service entity. For this, according to one embodiment, a device may receive an additional request message different from a query message. In this case, a request message includes an indicator for at least one service entity, and a device transmits information for accessing a service entity corresponding to the indicator as a response to the request message. According to another embodiment, information for access may be included in the information received in the step S903. In this case, the step S1107 may be included in the above-described step S1105 or be performed separately. For example, information for access may include CoA.

Figure 12:
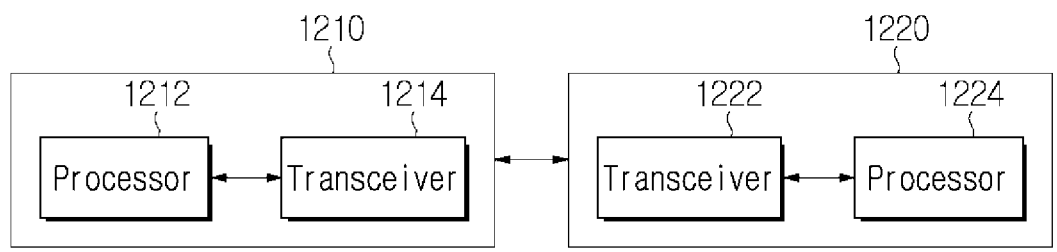
FIG. 12 is a view illustrating a configuration of M2M devices in an M2M system according to the present disclosure.

FIG. 12 is a view illustrating a configuration of M2M devices in an M2M system according to the present disclosure. The M2M device 1210 or the M2M device 1220 illustrated in FIG. 12 may be understood as hardware functioning as at least one among the above-described AE, CSE and NSE.

Referring to FIG. 12, the M2M device 1210 may include the processor 1212 controlling a device and the transceiver 1214 transmitting and receiving a signal. Here, the processor 1212 may control the transceiver 1214. In addition, the M2M device 1210 may perform a communication with another M2M device 1220. Another M2M device 1220 may also include the processor 1222 and the transceiver 1224, and the processor 1222 and the transceiver 1224 may perform the same function as the processor 1212 and the transceiver 1214.

For example, the originator and the receiver, which are described above, may be one of the M2M devices 1210 and 1220 of FIG. 12, respectively. In addition, the devices 1210 and 1220 of FIG. 12 may be different devices. For example, the devices 1210 and 1220 of FIG. 12 may be communication devices, vehicles or base stations. In other words, the devices 1210 and 1220 of FIG. 12 refer to devices, which can perform a communication, and are not limited to the above-described embodiments.

According to the present disclosure, information on Common Service Entity (CSE), which can provide a suitable Internet of Things (IoT) service for Application Entity (AE), may be effectively provided.

Effects obtained in the present disclosure are not limited to the above-mentioned effect, and other effects not mentioned above may be clearly understood by those skilled in the art from the following description.

The above-described embodiments of the present invention may be implemented by various means. For example, the embodiments of the present invention may be implemented by hardware, firmware, software, or a combination thereof.

The foregoing description of the preferred embodiments of the present invention has been presented for those skilled in the art to implement and perform the invention. While the foregoing description has been presented with reference to the preferred embodiments of the present invention, it will be apparent to those skilled in the art that various modifications and variations can be made in the present invention without departing from the spirit or scope of the present invention as defined by the following claims. Accordingly, the present invention is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the invention and the method invention are explained, and the description of both inventions may be supplemented as necessary.

In addition, the present invention has been described with reference to preferred embodiments thereof. It will be understood by those skilled in the art that various changes in form and details may be made therein without departing from the essential characteristics of the present invention. Therefore, the disclosed embodiments should be considered in an illustrative sense rather than in a restrictive sense. The scope of the present invention is defined by the appended claims rather than by the foregoing description, and all differences within the scope of equivalents thereof should be construed as being included in the present invention.

What is claimed is:

1. A method for a Machine-to-Machine (M2M) device for providing a service in an M2M system, the method comprising:

transmitting a first message requesting registration of information on the M2M device to a registry;

receiving a second message about the completion of the registration from the registry;

based on the information on the M2M device registered in the registry, receiving a third message requesting a service from another M2M device; and providing a service to the another M2M device, wherein the transmitting the first message comprises, receiving a request message to register description information in the registry from the registry, wherein the request message includes a request of publication of the M2M device to the registry and address information of the registry; and in response to the request message of the registry, creating and transmitting the first message.

2. The method of claim 1, wherein the first message comprises description information of the M2M device, and wherein the description information comprises information on a service that can be provided by the M2M device.

3. The method of claim 2, wherein the first message comprises at least one of information designating a resource, which stores the description information, and information indicating whether or not a service of the M2M device is available.

4. The method of claim 3, wherein the resource comprises <platformRegistry> resource.

5. The method of claim 1, further comprises:
receiving a fourth message for liveness check from the registry and
transmitting a fifth message indicating the service availability status of the M2M device in response to the fourth message.

6. A Machine-to-Machine (M2M) device for providing a service in an M2M system, the device comprising:
a transceiver configured to transmit and receive a signal; and
a processor configured to control the transceiver, wherein the processor is further configured to:
transmit a first message requesting registration of information on the M2M device to a registry;
receive a second message about the completion of the registration from the registry;
based on the information on the M2M device registered in the registry, receive a third message requesting a service from another M2M device; and
providing the service to the another M2M device,
wherein the transmitting the first message comprises,
receiving a request message to register description information in the registry from the registry, wherein the request message includes a request of publication of the M2M device to the registry and address information of the registry; and in response to the request message of the registry, creating and transmitting the first message.

* * * * *